(12) United States Patent
Schade (10) Patent No.: US 11,519,391 B2
(45) Date of Patent: Dec. 6, 2022

(54) WIND TURBINE AND METHOD FOR OPERATING A WIND TURBINE

(71) Applicant: Siemens Gamesa Renewable Energy Service GmbH, Hamburg (DE)

(72) Inventor: Horst Schade, Barkelsby (DE)

(73) Assignee: Siemens Gamesa Renewable Energy Service GmbH, Hamburg (DE)

( * ) Notice: Subject to any disclaimer, the term of this patent is extended or adjusted under 35 U.S.C. 154(b) by 10 days.

(21) Appl. No.: 17/421,654

(22) PCT Filed: Dec. 18, 2019

(86) PCT No.: PCT/EP2019/085920
§ 371 (c)(1),
(2) Date: Jul. 8, 2021

(87) PCT Pub. No.: WO2020/144025
PCT Pub. Date: Jul. 16, 2020

(65) Prior Publication Data
US 2022/0090583 A1 Mar. 24, 2022

(30) Foreign Application Priority Data
Jan. 8, 2019 (DE) .................. 10 2019 000 055

(51) Int. Cl.
*F03D 80/50* (2016.01)
*F03D 13/10* (2016.01)

(52) U.S. Cl.
CPC ............ *F03D 80/50* (2016.05); *F03D 13/10* (2016.05); *F05B 2240/916* (2013.01); *F05B 2260/301* (2013.01)

(58) Field of Classification Search
CPC .......... F03D 80/50; F03D 13/10; F03D 13/20; F03D 1/0658; F03D 1/065; F03D 1/0691;
(Continued)

(56) References Cited

U.S. PATENT DOCUMENTS

2007/0258823 A1\* 11/2007 Haarh ..................... B66C 1/108
29/889.6
2018/0282134 A1 10/2018 Lagerweij et al.

FOREIGN PATENT DOCUMENTS

DE 102006008428 A1 9/2007
EP 2213876 A1 \* 8/2010 ............. F03D 80/10
(Continued)

OTHER PUBLICATIONS

Written Opinion of the International Searching Authority for PCT/EP2019/085920 (Year: 2021).\*
(Continued)

*Primary Examiner* — Woody A Lee, Jr.
*Assistant Examiner* — Eric A Lange
(74) *Attorney, Agent, or Firm* — Dorton & Willis, LLP (57) ABSTRACT

A wind turbine having a support structure and a method for operating a wind turbine. The support structure includes a structural component and a reinforcing element. The structural component has fastening holes provided for fastening an operating means. The wind turbine can be operated in at least two states. In an operating state, the reinforcing element is screwed to the fastening portion of the structural component by screw connections which are preloaded in a defined manner using the fastening holes. In a maintenance state, the screw connections are released and the reinforcing element is removed from the structural component of the support structure. A maintenance device can be connected to the fastening portion of the structural component using the fastening holes provided for fastening a maintenance device.

19 Claims, 1 Drawing Sheet

(58) Field of Classification Search
CPC .......... F05B 2240/916; F05B 2260/301; F05B 2260/30; F05B 2230/61; F05B 2230/80; F05B 2240/912; F05B 2260/02; Y02E 10/72; Y02E 10/728
See application file for complete search history.

(56) References Cited

FOREIGN PATENT DOCUMENTS

| | | | | |
|---|---|---|---|---|
| EP | 2924282 A1 * | 9/2015 | ............. | F03D 13/20 |
| EP | 2924282 A1 | 9/2015 | | |
| EP | 3712422 A1 * | 9/2020 | ........... | F03D 1/0675 |
| WO | WO-2006077084 A1 * | 7/2006 | ............. | F03D 80/10 |

OTHER PUBLICATIONS

European Patent Office; Search Report in related International Patent Application No. PCT/EP2019/085920 dated Apr. 20, 2020; 4 pages.
European Patent Office; Written Opinion in related International Patent Application No. PCT/EP2019/085920 dated Apr. 20, 2020; 9 pages.
German Patent Office; Search Report in related German Patent Application No. 10 2019 000 055.2 dated Oct. 17, 2019; 7 pages.

* cited by examiner

WIND TURBINE AND METHOD FOR OPERATING A WIND TURBINE

CROSS-REFERENCE TO RELATED APPLICATIONS

This application is a national phase application under 35 U.S.C. § 371 of International Patent Application No. PCT/EP2019/085920, filed Dec. 18, 2019 (pending), which claims the benefit of priority to German Patent Application No. DE 10 2019 000 055.2, filed Jan. 8, 2019, the disclosures of which are incorporated by reference herein in their entirety.

TECHNICAL FIELD

The present invention relates to a wind turbine having a support structure, wherein the support structure comprises at least one structural component having at least one fastening portion and at least one reinforcing element. The invention furthermore relates to a method for operating, in particular for maintaining, a wind turbine.

BACKGROUND

Wind turbines with support structures and reinforcing elements per se for reinforcing, in particular for stiffening, support structures are generally known from the prior art. Against this background, it is an object of the invention to provide an alternative wind turbine, in particular an improved wind turbine, which is in particular advantageous with regard to operational stability design and/or which is in particular advantageous with regard to its maintenance properties.

SUMMARY

This object is achieved by a wind turbine and a method for operating a wind turbine as shown and described herein.

A first aspect of the invention relates to a wind turbine having a support structure, wherein the support structure comprises at least one structural component having at least one fastening portion and at least one reinforcing element, wherein the structural component comprises a plurality of fastening holes that are provided for fastening an operating means, wherein the structural component is at least partially dynamically loaded during operation of the wind turbine and at least one fastening hole lies in a region dynamically loaded during the operation of the wind turbine, and wherein the wind turbine can be operated in at least two states, wherein a first state is an operating state and a second state is a maintenance state, wherein, in the operating state, the reinforcing element is screwed to the fastening portion of the structural component by means of defined pre-stressed screw connections with screw fastening means inserted into at least some of the fastening holes provided for fastening an operating means, and wherein, in the maintenance state, the screw connections are released and the reinforcing element is removed from the structural component of the support structure, and an operating means can be connected to the fastening portion of the structural component via the fastening holes provided for fastening an operating means.

As a result of the screwed connection of the reinforcing element to the structural component provided in the operating state, a more favorable stress distribution in the support structure at forces occurring during operation can be achieved, whereby, in particular, a higher operational stability can be achieved. This is attributable in particular to reinforcement by the additional reinforcing element and to the filling of at least some of the existing fastening holes by corresponding screw fastening means.

A corresponding design, in particular a correspondingly suitable choice of material for the reinforcing element and the support structure, and a corresponding dimensioning of the associated screw connections can reduce a notch effect in the structural component caused in particular by the fastening holes, resulting in particular in lower excess stresses in the region around the fastening holes.

The support structure, in particular the structural component and/or the reinforcing element, is preferably made of steel, and the structural component is made of, in particular, cast steel, while the reinforcing element is in particular made of rolled steel.

By inserting screw fastening means into the fastening holes and covering the structural component by means of a reinforcing element, surfaces of the structural component can also be protected from soiling and/or from corrosion.

The use of a separate reinforcing element compared to a mere increase in the wall thickness of the structural component has the further advantage that a thickness of the reinforcing element can be flexibly selected, and, in particular without having to adapt corresponding operating means, for example those existing or provided for maintenance of the wind turbine, or without providing corresponding adapters for the fastening of one or more operating means, which in some cases could otherwise possibly become necessary in the case of a greater wall thickness of the structural component due to the different installation space conditions, in particular due to the greater space requirement of the structural component.

Thus, the use of a separate reinforcing element that, in the operating state, is screwed to the structural component via the fastening holes provided for fastening an operating means, instead of a larger dimensioned structural component, enables, on the one hand, flexible reinforcement that can be achieved simply by adapting the reinforcing element, for example by increasing the thickness of the reinforcing element.

On the other hand, the inventive use of a separate reinforcing element enables the use of an operating means for different wind turbines, in particular for maintaining different wind turbines having different dimensions and different dimensions of the support structure, in particular of the structural component, given the same position and orientation of the fastening portion, for example relative to the rotor and/or to the rotor shaft or the like.

Within the meaning of the present invention, a "wind turbine" is understood to mean a system for converting wind energy into useful energy, in particular electrical energy.

Within the meaning of the present invention, a "support structure" is understood to mean a structure that has a supporting function for the stability of the wind turbine and is thus to be considered in the stability design of the wind turbine, and that is in particular important for the stability of the wind turbine and that is preferably to be designed with regard to its stability according to specific specifications, in particular statutory specifications.

Support structures of a wind turbine are, for example, components or assemblies, such as the rotor hub, a rotor blade extender, the rotor shaft, a rotor bearing block or the machine carrier.

Within the meaning of the present invention, a "structural component" is understood to mean a component that forms a support structure or is part of a support structure.

Within the meaning of the present invention, a "reinforcing element" is understood to mean a component that serves to reinforce another component, in particular to reinforce a structural component.

Within the meaning of the present invention, a "dynamic load" is understood to be a load that varies over time, whereas, in contrast, a "static load" is understood to be a load that is substantially constant over time or a load that does not change or changes only slightly over a longer, defined period of time.

At least one operating means that can be connected to the fastening portion of the structural component is particularly preferably screwable to the structural component, in particular by means of defined pre-stressed screw connections with screw fastening means that can be inserted into at least a part of the fastening holes provided for fastening the operating means.

The screw fastening means with which the operating means can be screwed to the structural component can be the same screw fastening means as those with which the reinforcing element is screwed to the structural component in the operating state. In some cases, however, it can be more advantageous to provide other screw fastening means for a screwed connection of an operating means to the structural component, for example of a different length (the diameter should preferably be identical due to the same fastening holes used).

In an advantageous embodiment of a wind turbine according to the present invention, the structural component, in particular the fastening portion, is configured for fastening an operating means, in particular a maintenance device, for and/or during a performance of maintenance work, wherein the operating means is preferably a lifting tool or a maintenance tool, in particular a supporting device, which is formed to support one or more parts of the wind turbine, such as a supporting device for supporting a rotor, a rotor hub, a rotor shaft or a transmission or generator of the wind turbine in the maintenance state. In this case, the operating means can in particular be a retaining clip, for example a rotor retaining clip, as is known in principle from the prior art and is used in maintenance work to maintain wind turbines, for example during a component exchange, such as a gear exchange or a rotor shaft exchange.

In a further advantageous embodiment of an inventive wind turbine, the fastening portion comprises at least one functional surface, and at least some of the fastening holes, in particular all of the fastening holes of the fastening portion, extend through the functional surface, preferably transversely, in particular perpendicularly, to the functional surface.

The fastening portion of the structural component is preferably a flange portion or comprises a flange portion, wherein the flange portion comprises in particular at least one functional surface, for example a contact surface, an abutment surface, a supporting surface or a sealing surface, wherein at least one fastening hole extends, in particular through the flange portion, in particular through a functional surface of the flange portion, preferably transversely, in particular perpendicularly, to the functional surface. Particularly preferably, all of the fastening holes extend perpendicularly to an associated functional surface of the fastening portion of the structural component.

In particular in this case, by screwing a reinforcing element to the fastening portion via the fastening holes which are formed into the fastening portion and substantially provided for connecting an operating means to the structural component, an advantageous stress distribution can be achieved since considerable excess stresses can occur around the fastening holes, in particular due to fastening holes formed into the fastening portion in this manner, in the event of a tensile load applied transversely to the fastening holes.

In a preferred embodiment of a wind turbine according to the present invention, the reinforcing element rests at least partially against the functional surface of the fastening portion, in particular in a manner at least partially planar, preferably completely planar, i.e., with at least one surface completely, in particular a lower side, for example. This makes it possible to bring about good planar contact of the reinforcing element on the structural component and thus good stiffening of the support structure. On the other hand, good covering and thus good protection against soiling and corrosion of the structural component can be achieved.

In a further advantageous embodiment of an inventive wind turbine, the structural component is at least partially dynamically loaded under tensile stress during the operation of the wind turbine, in particular with a load direction transverse, in particular perpendicular, to the direction of extent of the fastening holes, in particular parallel to the functional surface. That is, the structural component is preferably a component that is at least partially dynamically loaded under tensile stress during the operation of the wind turbine, in particular loaded in a load direction transverse, in particular perpendicular, to the direction of extent of the fastening holes.

In particular in this case, by inventively screwing a reinforcing element to the structural component via the fastening holes, which are provided for fastening an operating means and are thus not normally used in the operating state, a considerably more favorable stress distribution can be achieved in the operating state since excess stresses, in particular around the fastening holes, can be considerably reduced in this manner by screwing the reinforcing element to the structural component via the fastening holes, whereby a higher operational stability can be achieved as a result.

The screwed connection of the reinforcing element via the fastening holes provided for fastening an operating means in the structural component is particularly suitable for reducing excess stresses or exhibits particularly great effect there if at least one of the fastening holes is in a highly dynamically loaded region, i.e., in a stochastically or cyclically dynamically alternatingly and/or dynamically pulsatingly loaded region, wherein the inventive benefit for reinforcing a structural component is particularly advantageous in the case of dynamically pulsating tensile loads, in particular in the case of dynamically pulsating tensile loads with a tensile load direction transverse to the fastening holes, in particular in the case of tensile loads perpendicular to the fastening holes or parallel to the functional surface.

In a further advantageous embodiment of an inventive wind turbine, at least one fastening hole, in particular at least one fastening hole in the structural component, is a through-opening or a through-hole, wherein preferably at least one screw connection is a push-through screw connection.

Alternatively, at least one fastening hole, in particular at least one fastening hole in the structural component, can also be formed as a blind hole recess, wherein the blind hole recess in this case in particular comprises a corresponding internal thread, and in particular at least one screw connection is a blind hole screw connection, wherein, in this case, both the reinforcing element and a corresponding operating means can preferably each be screwed to the structural component by means of a blind hole screw fitting via the blind hole recess.

It is also conceivable that at least one fastening hole, in particular at least one fastening hole in the structural component and/or at least one associated fastening hole in the reinforcing element, is formed for a stud bolt screw connection or a stud bolt screw fitting, wherein for a stud bolt screw connection, both the structural component and the reinforcing element preferably each comprise at least one associated fastening hole formed as a blind hole.

In contrast, if a fastening hole is formed as a through-opening, in particular as a through-bore, an internal thread can be provided. Preferably, however, the through-opening does not have an internal thread since, with a smooth inner wall of a bore, lower excess stresses result in the region around the fastening holes and thus a lower number of shapes and a lower notch factor, which in turn has a positive effect on operational stability, because the lower the notch factor, the higher the achievable operational stability.

In addition, a through-opening, in particular a through-bore, with a push-through screw connection has the advantage that an entire length of the screw connection can be pre-stressed to pressure, whereby a more advantageous, in particular more uniform, stress state in the region around the fastening hole can be achieved.

In a particularly advantageous embodiment of a wind turbine according to the present invention, at least one screw connection, in particular at least one screw connection with which the reinforcing element is screwed to the structural component via at least one fastening hole, is pre-stressed in such a manner that a residual compressive stress state exists in a region around the associated fastening hole and the screw connection in the unloaded state of the support structure.

By inserting a residual compressive stress state into the region around the fastening hole by pre-stressing the screw connection with a defined pre-stressing force, i.e., by tightening the screw connection in a defined manner, in particular in a torque-controlled or angle-controlled manner, tensile loads occurring in particular during operation can be at least partially compensated for, depending on the magnitude of the residual compressive stresses.

In order to be able to compensate for as large a proportion as possible of the tensile loads occurring during operation, in particular tensile loads occurring transversely to the fastening holes, at least one screw connection is pre-stressed in a defined manner such that the residual compressive stresses induced as a result of the pre-stressing of the screw connection are so great that, over at least 50 percent of a defined design operating time, preferably over at least 75 percent, in particular over 90 percent, particularly preferably over 95 percent, in particular over the entire design operating time, i.e., over 100 percent of the design operating time of the wind turbine, only tensile stresses, in particular resultant tensile stresses, with an amplitude reduced compared to a state without residual compressive stresses, in particular only with an amplitude reduced by a defined amount, for example only tensile stresses with an amplitude reduced by at least 20 percent or at least 30 percent or at least 50 percent, occur transversely to the fastening hole in a region adjacent to the associated fastening hole around the associated fastening hole during a target operation of the wind turbine. Particularly preferably, the pre-stressing of the screw connection is selected to be great enough that, as a result, only resulting tensile stresses with a tensile stress amplitude reduced by more than 80 percent occur transversely to the fastening hole.

In the present disclosure, a "target operation" is understood to mean an operation in which only forces occur that have been taken into account as normal operating forces during the design, that is, no forces occurring in the event of misuse and no unpredictably large forces that have not been considered or are not to be considered in the design of the wind turbine, according to the specifications to be met, in particular according to the legal requirements to be met for the design of a wind turbine.

In a further advantageous embodiment of an inventive wind turbine, in the operating state of the wind turbine, a primary function of the reinforcing element is a reinforcement of the structural component to which the reinforcing element is screwed. That is, the reinforcing element preferably does not serve as a carrier or support structure for an assembly or a further component but is in particular mainly provided and formed for reinforcing the structural component, wherein a cover of the fastening holes by the reinforcing element is viewed in the present document in particular only as an ancillary function or a secondary function.

In a further advantageous embodiment of an inventive wind turbine, the reinforcing element has a contact surface and rests therewith flat against the structural component in the operating state of the wind turbine, preferably against the fastening portion of the structural component, in particular against the functional surface of the fastening portion of the structural component, wherein the reinforcing element preferably rests with a contiguous contact surface, in particular with a single contiguous contact surface, against the structural component or a structural assembly. That is, in one possible, in particular advantageous embodiment, the reinforcing element is formed to be, for example, not bridge-like or the like and does not span like a bridge, for example like a bearing receptacle, across a region lying between two fastening portions.

In particular, the reinforcing element is preferably neither a carrier nor a receptacle for connecting, fastening or receiving a further component.

In a further advantageous embodiment of an inventive wind turbine, the reinforcing element is preferably formed to be plate-like or in a plate shape or a plate, in particular a steel plate. On the one hand, good planar covering of the fastening portion, in particular of an associated functional surface, can thereby be achieved with a low installation space requirement and a relatively low additional weight, which in particular enables screwing a reinforcing element to the structural component via as many fastening holes as possible, as a result of which in turn as many fastening holes as possible can be filled with a screw fastening means. This in turn has an advantageous effect on the stress distribution in the support structure, in particular in the structural component.

In a particularly advantageous embodiment of a wind turbine according to the present invention, the reinforcing element has a thickness of at least 10 percent, in particular of at least 15 percent, preferably of at least 20 percent, in particular of at least 30 percent, of an average wall thickness of the fastening portion in a region reinforced by the reinforcing element but at most a thickness of 40 percent, 50 percent or 100 percent of the average wall thickness of the fastening portion in this reinforcing region.

It has been found that good effects, in particular an advantageous increase in the operational stability of the structural component and thus of the support structure, can be achieved with such orders of magnitude, i.e., with such a ratio of a thickness of the reinforcing element to the wall thickness of the structural component.

In a further advantageous embodiment of a wind turbine according to the present invention, at least one circumferential side surface, in particular all circumferential side surfaces, of the reinforcing element is formed as a chamfer, in particular having an internal angle of at most 60 degrees, 45 degrees, 30 degrees, 20 degrees or 15 degrees, and preferably at least 10 degrees but in particular at least 15 degrees, to a separating plane extending between the fastening portion and the reinforcing element. As a result, a particularly advantageous cross-sectional transition from the structural component into the reinforcing region, in which the structural component is reinforced with the reinforcing element, can be achieved, which has an advantageous effect on the stress distribution in the support structure. In particular, large stress gradients can be reduced in this manner and a more advantageous stress progression can be achieved in the support structure.

In some cases, it can also be advantageous if at least one circumferential side surface of the reinforcing element is formed like a groove.

A second aspect of the invention relates to an inventive method for operating, in particular for maintaining, an inventive wind turbine and is characterized by the steps of:
a) Transferring the wind turbine from an operating state into a maintenance state by releasing the screw connections by means of which the reinforcing element is screwed to the structural component, and removing the reinforcing element,
b) Performing maintenance work, and
c) Transferring the wind turbine from the maintenance state into the operating state by providing the reinforcing element or a replacement reinforcing element and connecting the reinforcing element or the replacement reinforcing element to the fastening portion of the structural component by inserting screw fastening means into at least a part of the fastening holes provided for fastening an operating means, and screwing the reinforcing element or the replacement reinforcing element to the fastening portion of the structural component by means of defined pre-stressed screw connections.

If the fastening portion of the structural component comprises a corresponding functional surface, the reinforcing element or the replacement reinforcing element is preferably provided and arranged in particular in such a manner that it rests at least partially against the functional surface of the fastening portion of the structural component before screwing to the structural component.

In a particularly advantageous embodiment of a method according to the present invention, the method further comprises the following steps:
i) Providing an operating means,
ii) Connecting the operating means to the fastening portion of the structural component via the fastening holes provided for fastening an operating means,
iii) Releasing the connection of the operating means to the fastening portion of the structural component, and
iv) Removing the operating means,
wherein steps i) and ii) are preferably carried out before step b) and steps iii) and iv) are preferably carried out after step b).

This makes it possible to perform maintenance of the wind turbine in a simple manner, in particular with already available operating means, wherein the wind turbine is simultaneously advantageously designed with regard to its operational stability.

In a further advantageous embodiment of a method according to the present invention, the operating means is connected to the fastening portion of the structural component in step ii) via the fastening holes provided for fastening an operating means by inserting screw fastening means into at least some of the fastening holes provided for fastening the operating means and screwing the operating means to the structural component by means of defined pre-stressed screw connections.

By closing holes which are normally unused during an operating state, in particular during normal operation, and are provided in particular only for fastening corresponding operating means, for example in the case of maintenance, by screwing a reinforcing element to the structural component of a support structure, the fastening holes can on the one hand be covered and thus better protected from corrosion. On the other hand, a significantly more advantageous stress distribution in the structural component and thus a greater operational stability can be achieved.

If the screw connections with which the reinforcing element is screwed to the structural component are in this case pre-stressed in a defined manner such that a residual compressive stress state is set, the operational stability can be further increased, in particular if push-through screw connections are used, i.e., push-through screw fittings. In particular in the event of dynamically occurring tensile loads, in particular dynamically pulsating tensile loads, in particular with a tensile load direction transverse to the fastening holes, the operational stability can thereby be advantageously improved in a simple manner.

If the screw connections are pre-stressed in a defined manner in such a manner that the induced residual compressive stresses are high enough that no tensile stresses occur in the region around the fastening holes during at least 90 percent, preferably at least 95 percent, of the design operating time, the operational stability can be significantly improved compared to a support structure with only one structural component without a reinforcing element and corresponding fastening holes.

The features and advantages described with respect to the wind turbine and its advantageous embodiments also apply, at least to the extent technically reasonable, to the second aspect of the invention and thus also to an inventive method for operating such a wind turbine and its advantageous embodiments, and vice versa.

The invention is explained in more detail below with reference to non-limiting exemplary embodiments shown schematically in the figures.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
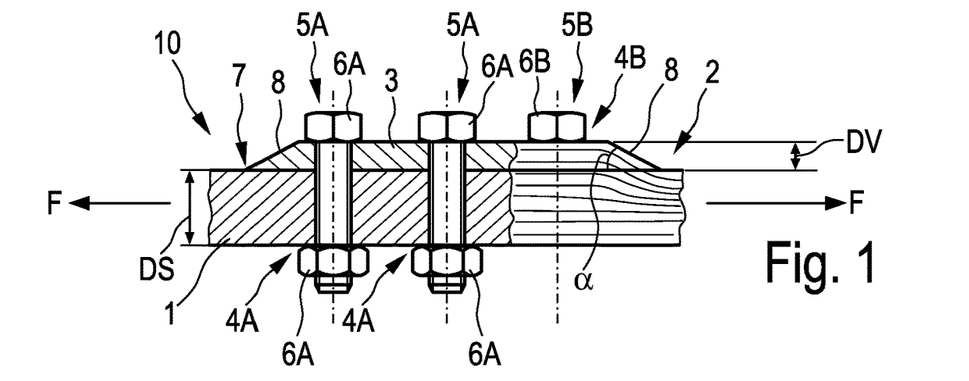
FIG. 1 depicts a partial section through a support structure of an inventive wind turbine having a structural component and a reinforcing element, wherein the reinforcing element is screwed to the structural component via fastening holes provided for fastening an operating means in the maintenance state of the wind turbine.

FIG. 1 shows a partial section through a support structure 10 of an inventive wind turbine, which is not shown further here, wherein the support structure comprises a structural component 1, which in this case is formed by the machine support frame of the wind turbine, as well as a reinforcing element 3, which is screwed to the structural component 1, i.e., to the machine carrier 1 in this case, via fastening holes 4A and 4B provided for fastening an operating means in the maintenance state.

The left part of the illustration in FIG. 1 shows the support structure 10 in a section, while the right part shows a stress progression within the support structure 10 as can be expected under a tensile load F as indicated by the arrows.

The support structure 10 is shown in FIG. 1 in an operating state in which the fastening holes 4A and 4B serve to screw the structural component 1 to the reinforcing element 3, while in a maintenance state not shown here (see FIG. 2 and FIG. 3), the fastening holes 4A and 4B are free, i.e., unoccupied, for fastening an operating means, for example a lifting tool or a supporting device, such as a retaining clip, in particular a rotor retaining clip, and can in particular be used for the screwed connection of the operating means.

For screwing the structural component 1 to the reinforcing element 3, the structural component 1 comprises in particular a fastening portion 2, which in this exemplary embodiment is a flange portion with a functional surface 7 on the upper side, which in particular has the function of a supporting surface for an operating means, such as a rotor retaining clip, which can be connected to the structural component 1, i.e., to the machine carrier 1, in a maintenance state.

The fastening holes 4A and 4B emerge in particular from the functional surface 7 and extend transversely, in particular perpendicularly, to the functional surface 7.

The reinforcing element 3 and the structural component 1 are screwed together by means of screw fastening means 6A and 6B inserted into the fastening holes 4A and 4B, wherein the two screw connections 5A and 5B shown further to the left are each plug-in screw connections, while the screw connection 5B is a blind hole screw fitting.

In order to produce the plug-in screw connections 5A, both the reinforcing element 3 and the structural component 1 each have corresponding fastening holes 4A in the form of through-openings 4A, in particular through-bores 4A, which, in this exemplary embodiment, have a smooth inner wall, i.e., no internal thread.

In contrast thereto, the screw connection 5B is a blind hole screw fitting, in which the reinforcing element 3 also has a corresponding through-bore for the passage of the associated screw fastening means 6B, in particular the screw 6B; however, a corresponding associated blind bore 4B is provided in the structural component 1 and in this case has a corresponding internal thread.

In this exemplary embodiment, the different design of the screw connections 5A and 5B serves substantially only to illustrate the different possibilities for designing one or more screw connections 5A, 5B for screwing the reinforcing element 3 to the structural component 1.

Instead of as shown in FIG. 1, all screw connections of the support structure for screwing the reinforcing element 3 to the structural component 1 may also be designed in each case as push-through screw connections 5A or as blind hole screw fittings 5B, which generally depends on the respective application and on the installation space conditions. For example, it can be in some cases that a push-through screw connection 5A is not possible for space reasons, but only a blind hole screw fitting 5B can be realized. In principle, stud bolt screw connections are also conceivable.

Compared to blind hole screw fittings 5B, push-through connections 5A have the advantage that, over the entire length of the screw connection, and in this case thus also over the entire thickness of the support structure 10, which is composed of a thickness DS of the structural component 1 and a thickness DV of the reinforcing element 3, through a defined introduced pre-stressing of the screw connections 5A, in particular with a sufficiently high pre-stressing of the screw connections 5A, a residual compressive stress state can be produced around the fastening holes 4A, while in the case of a blind hole screw fitting 5B, a residual compressive stress state can be induced only over a part of the entire thickness DS +DV of the support structure 10 in the region of the screw connection 5B, specifically only in the region of the screw but not beyond its length.

As indicated in FIG. 1 via the force arrows F denoted by "F," the support structure 10, in particular the structural component 1, is at least partially dynamically loaded under tensile stress during the operation of the wind turbine, wherein, in this case, the structural component 1 is loaded with a load direction transverse, in particular perpendicular, to the direction of extent of the fastening holes 4A and 4B.

All of the fastening holes 4A and 4B are located in a highly dynamically loaded region of the fastening portion 2, i.e., in a stochastically or cyclically dynamically alternatingly and/or dynamically pulsatingly loaded region, wherein the fastening holes 4A and 4B in this case are located in a region dynamically pulsatingly loaded with tensile stress with a load direction transverse, in particular perpendicular, to the longitudinal axis of the fastening holes 4A and 4B.

In order to at least partially compensate for a large proportion of the tensile load acting on the support structure 10, in particular the structural component 1, during operation, the screw connections 5A and 5B, in particular the screw connections 5A, are each pre-stressed in such a manner that, in each case, a residual compressive stress state exists in a region around the associated fastening holes 4A or 4B in the unloaded state of the support structure 10.

The pre-stressing force is selected in particular in such a manner that no tensile stresses occur transversely to the fastening holes 4A and 4B around them, in particular in a region adjacent to the holes 4A and 4B, over at least 90 percent of a total design operating time of the associated wind turbine during a target operation.

Critical tensile stresses can be at least partially compensated for by the residual compressive stresses induced by the pre-stressing of the screw connections 5A and 5B, which advantageously affects the operational stability and in particular leads to higher operational stability values.

The additional reinforcement of the structural component 1 with the reinforcing element 3 makes it possible to further improve the stress distribution in the support structure 10 and thereby increase the operational stability even further.

By using the fastening holes 4A and 4B in the structural component 1, which holes are already required for fastening at least one operating means, no additional fastening holes are required, on the one hand, for reinforcing the structural component 1. On the other hand, the use of the otherwise unused and thus open fastening holes 4A and 4B, which are not required during operation and serve only for maintenance purposes, in particular the insertion of the screw fastening means 6A and 6B in the fastening holes 4A and 4B, respectively, also has the effect of filling them, which also has an advantageous effect on the stress distribution in the structural component 1, in particular in the fastening portion 2.

In particular, in this manner, excess stresses normally generated around the fastening holes 4A and 4B due to the notch effect caused by the fastening holes 4A and 4B can be reduced and thus stress concentrations around the fastening holes 4A and 4B can be reduced. This makes it possible, above all, to reduce the probability of developing stress cracks in the region of the fastening holes 4A and 4B.

It has been found that a particularly advantageous support structure 10, in particular a particularly space-saving support structure, can be achieved if the reinforcing element 3 is formed to be plate-like or is a plate, as shown in FIG. 1 by way of example.

In this manner, with the aid of the reinforcing element 3, not only can a reinforcement of the structural component 1 also be brought about but the functional surface 7 can also be covered over a large area, as a result of which the functional surface 7 can be protected from dirt and corrosion.

The insertion of the screw fastening means 5A and 5B into the fastening holes 4A and 4B also has the advantage that the fastening holes 4A and 4B are no longer exposed and can thus likewise be better protected against dirt and corrosion during operation.

In order to achieve as advantageous a stress progression as possible in the support structure 10 under load, it is advantageous if, as shown in FIG. 1, at least one circumferential side of the reinforcing element 3 has a chamfer 8, in particular a chamfer with an internal angle α of between 10 degrees and 60 degrees, wherein an internal angle α of 30 degrees, as shown here by way of example, has been found to be advantageous. With the aid of such chamfers 8 on the circumferential side surfaces, an advantageous increase in the cross-section of the support structure 10 can be achieved and, as a result, an advantageous stress progression within the support structure 10. In particular, high stress gradients, in particular jumps in the stress progression, can be avoided.

Instead of a chamfer 8, at least one circumferential side surface could also be groove-shaped or the like. As a result, an even further improved stress progression can possibly be achieved within the support structure 10 in some cases.

In this exemplary embodiment of a support structure 10 of an inventive wind turbine, the thickness DV of the reinforcing element 3 is 30 percent of the thickness DS of the structural component 1.

Figure 2:
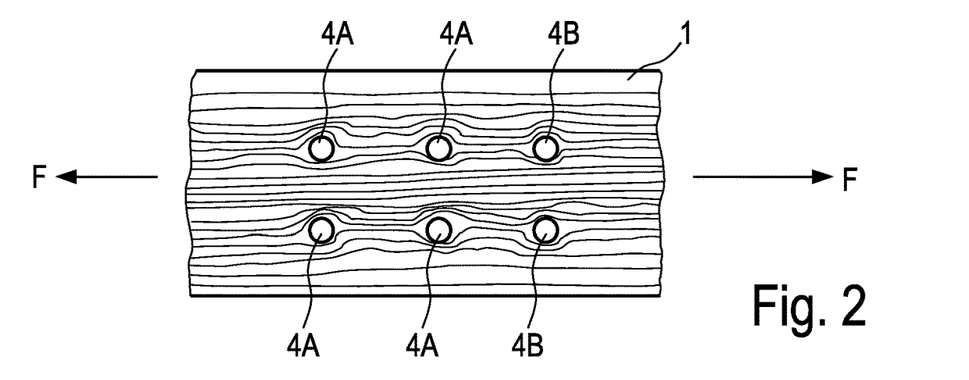
FIG. 2 depicts the structural component of FIG. 1 in a single-part illustration as viewed from above.

FIG. 2 shows the structural component 1 of the support structure 10 from FIG. 1 in a maintenance state, in which the screw connections 5A and 5B are released and the reinforcing element 3 is removed so that an operating means (not shown) can be connected to the structural component 1 via the fastening holes 4A and 4B, in particular for maintenance purposes.

In addition, FIG. 2 shows a stress progression within the structural component 1, as can be expected under a tensile load F as indicated by the arrows. It can be seen that the force lines must bypass the open holes in the form of the fastening holes 4A and 4B, as a result of which significant stress concentrations (the distance between the force lines is a measure of the stress in the component) occur in the region of the fastening holes 4A and 4B.

Figure 3:
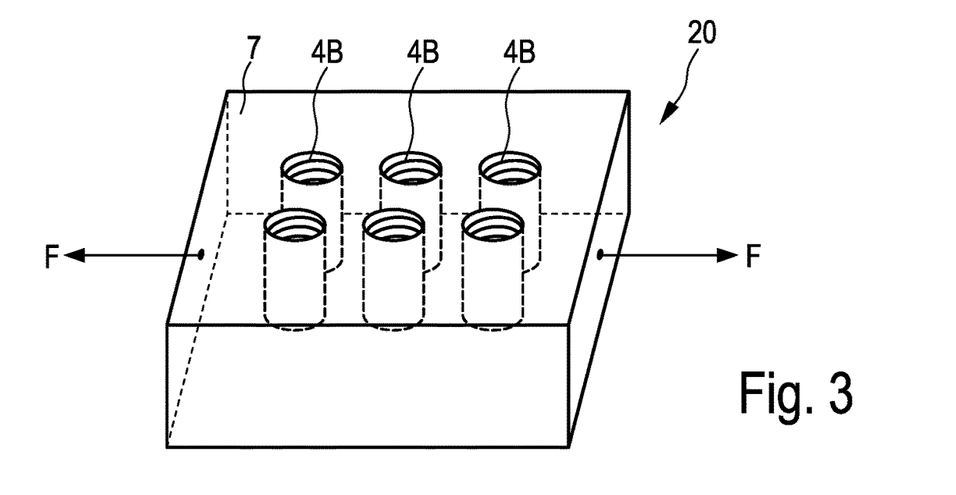
FIG. 3 depicts the structural component from FIGS. 1 and 2 in a perspective view.

FIG. 3 shows a further exemplary embodiment of a cuboid section of the structural component 20 for an inventive wind turbine, wherein, in this exemplary embodiment, all of the fastening holes 4B each have an internal thread.

As already mentioned several times, in an inventive wind turbine, the screw connections 5A and 5B of the support structure 10 from FIG. 1 provided in the operating state are removed for maintenance purposes from the fastening holes 4A and 4B originally provided only for maintenance purposes so that the fastening holes 4A and 4B can be used for fastening one or more operating means, wherein the following steps are carried out when carrying out an inventive method for operating, in particular for maintaining, an inventive wind turbine:

a) Transferring the wind turbine from an operating state into a maintenance state by releasing the screw connections 5A and 5B by means of which the reinforcing element 3 is screwed to the structural component 1, and removing the reinforcing element 3, b) Performing maintenance work, and c) Transferring the wind turbine from the maintenance state into the operating state by providing the reinforcing element 3 or a replacement reinforcing element and connecting the reinforcing element 3 or the replacement reinforcing element to the fastening portion 2 of the structural component 1 by inserting screw fastening means 6A and 6B into at least a part of the fastening holes 4A and 4B provided for fastening an operating means and screwing the reinforcing element 3 or the replacement reinforcing element to the fastening portion of the structural component 1 by means of defined pre-stressed screw connections 5A and 5B.

The screw connections 5A and 5B are thereby produced in particular with such a defined pre-stressing, which is dimensioned such that residual compressive stresses are induced, which are high such that no tensile stresses occur in the region around the fastening holes 4A and 4B over a defined proportion of a design operating period.

In this exemplary embodiment, the pre-stressing is selected in such a manner that no tensile stresses occur during a target operation in the region, in particular in the fastening region or the reinforcing region of the structural component 1, over at least 90 percent of the design operating period.

If the reinforcing element 3 is removed, as in FIGS. 2 and 3, a corresponding operating means can be connected, in particular screwed, to the structural component 1 via the fastening holes 4A and 4B, wherein the screw connections for fastening the operating means are also preferably produced, in particular in a preferred implementation of an inventive method, with a defined pre-stressing force.

In a wind turbine formed according to a further invention, the reinforcing element is omitted compared to the present invention. This means that a wind turbine according to a further invention only comprises screw fastening means that are inserted into the fastening holes of the structural component and are pre-stressed in a defined manner in the operating state and released in the maintenance state, and the fastening holes can be used for fastening an operating means.

Accordingly, in a method for operating a wind turbine according to the further invention, the removal and arrangement and rescrewing of the reinforcing element is dispensed with. In each case, when transferring the wind turbine from the operating state into the maintenance state or vice versa, only the screw connections are to be released, the screw fastening means are to be removed and the screw connections are to be restored after the maintenance work has been performed.

In some cases, this can already provide advantages; in particular, at least the fastening holes may thereby be filled, whereby at least an improved corrosion protection results. Furthermore, the insertion of the screw connections and a defined pre-stressing of the screw connections already bring about low residual compressive stresses, which in some applications may already be sufficient to increase the operational stability of the structural component by a desired amount.

The advantage of the further invention is that economic savings can be achieved in many cases by omitting the reinforcing element as well as the aforementioned method steps and a faster transfer of a wind turbine from the operating state to the maintenance state and vice versa is also possible in many cases.

Naturally, a plurality of modifications, in particular of a constructive nature, is possible without departing from the content of the claims.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS 1, 20 Structural component
2 Fastening portion of the structural component
3 Reinforcing element
4A Fastening hole without a thread
4B Fastening hole with a thread
5A, 5B Screw connections
6A, 6B Screw fastening means
7 Functional surface
8 Chamfer
10 Support structure
DS Thickness of the structural component
DV Thickness of the reinforcing element
α Internal angle

What is claimed is:

1. A wind turbine, comprising:
a support structure comprising at least one structural component with at least one fastening portion, and at least one reinforcing element;
wherein the structural component includes a plurality of fastening holes configured for fastening an operating means;
wherein the operating means is at least one of:
a maintenance device,
a lifting tool or maintenance tool, or
a supporting device that is formed to support one or more parts of the wind turbine;
wherein the structural component is at least partially dynamically loaded during operation of the wind turbine, and at least one of the plurality of fastening holes lies in a region dynamically loaded during operation of the wind turbine;
wherein the wind turbine is convertible between at least two states, wherein a first state is an operating state and a second state is a maintenance state;
wherein, in the operating state, the reinforcing element is screwed to the fastening portion of the structural component to achieve defined pre-stressed screw connections comprising screw fastening means inserted into at least some of the plurality of fastening holes; and
wherein, in the maintenance state, the screw connections are released and the reinforcing element is removed from the structural component of the support structure, whereby an operating means can be connected to the fastening portion of the structural component via the fastening holes.

2. The wind turbine of claim 1, wherein the structural component is at least one of:
configured to fasten an operating means for the performance of maintenance work; or
configured to fasten an operating means during the performance of maintenance work.

3. The wind turbine of claim 2, wherein
the fastening portion of the structural component is configured to fasten an operating means.

4. The wind turbine of claim 1, wherein:
the fastening portion has at least one functional surface; and
at least some of the fastening holes of the fastening portion extend from the functional surface.

5. The wind turbine of claim 1, wherein the structural component is configured to be at least partially dynamically loaded under tensile stress during operation of the wind turbine.

6. The wind turbine of claim 1, wherein at least one of:
at least one fastening hole is a through-opening or
at least one screw connection is a push-through screw connection.

7. The wind turbine of claim 1, wherein at least one screw connection is pre-stressed in such a manner that a residual compressive stress state exists in a region around the associated fastening hole RECEIVING the screw connection in AN unloaded state of the support structure.

8. The wind turbine of claim 7, wherein at least one screw connection is pre-stressed in a defined manner such that the residual compressive stresses induced as a result of the pre-stressing of the screw connection are great enough that over at least 50 percent of a defined design operating time, only tensile stresses with an amplitude that is reduced compared to a state without residual compressive stresses occur transversely to the fastening hole in a region adjacent to the associated fastening hole around the fastening hole during a target operation of the wind turbine.

9. The wind turbine of claim 1, wherein the reinforcing element is configured such that, in the operating state of the wind turbine, a primary function of the reinforcing element is a reinforcement of the structural component to which the reinforcing element is screwed.

10. The wind turbine of claim 1, wherein:
the reinforcing element includes a contact surface that rests flat against the structural component in the operating state of the wind turbine; and
the contact surface is a contiguous contact surface.

11. The wind turbine of claim 1, wherein the reinforcing element is plate-like, has a plate shape, or is a plate.

12. The wind turbine of claim 11, wherein:
the reinforcing element has a thickness of at least:
10 percent of an average wall thickness of the fastening portion in a region reinforced by the reinforcing element,
15 percent of the average wall thickness of the fastening portion in the reinforcing region,
20 percent of the average wall thickness of the fastening portion in the reinforcing region, or
30 percent of the average wall thickness of the fastening portion in the reinforcing region; and
the thickness of the reinforcing element is at most:

40 percent of the average wall thickness of the fastening portion in the reinforcing region,
50 percent of the average wall thickness of the fastening portion in the reinforcing region, or
100 percent of the average wall thickness of the fastening portion in the reinforcing region.

13. The wind turbine of claim 1, wherein at least one circumferential side surface of the reinforcing element is formed as a chamfer.

14. A method for operating a wind turbine, the wind turbine comprising a support structure including at least one structural component with at least one fastening portion, and at least one reinforcing element, the structural component including a plurality of fastening holes configured for fastening an operating means, the reinforcing element screwed to the fastening portion to achieve defined pre-stressed screw connections comprising screw fastening means inserted into at least some of the plurality of fastening holes, the method comprising:
   transferring the wind turbine from an operating state into a maintenance state by:
      releasing the screw connections that couple the reinforcing element to the structural component,
      removing the reinforcing element, and
      connecting the operating means to the fastening portion of the structural component via the plurality of fastening holes,
      wherein the operating means is at least one of a maintenance device, a lifting tool or maintenance tool, or a supporting device that is formed to support one or more parts of the wind turbine;
   performing maintenance work on the wind turbine; and
   transferring the wind turbine from the maintenance state into the operating state by:
      obtaining the reinforcing element or a replacement reinforcing element, and
      connecting the reinforcing element or the replacement reinforcing element to the fastening portion of the structural component by inserting screw fastening means into at least some of the fastening holes and screwing the reinforcing element or the replacement reinforcing element to the fastening portion of the structural component to achieve defined pre-stressed screw connections.

15. The method of claim 14, wherein at least one of:
   operating the wind turbine comprises maintaining the wind turbine; or
   at least one of the plurality of fastening holes lies in a region that is dynamically loaded during operation of the wind turbine.

16. The method of claim 14, further comprising:
   obtaining an operating means.

17. The method of claim 16, further comprising:
   releasing the connection of the operating means to the fastening portion of the structural component; and
   removing the operating means.

18. The method of claim 16, wherein connecting the operating means to the fastening portion comprises:
   inserting screw fastening means into at least some of the fastening holes; and
   screwing the operating means to the structural component to achieve the defined pre-stressed screw connections.

19. A method for operating a wind turbine, wherein the wind turbine is configured according to claim 16, the method comprising:
   transferring the wind turbine from an operating state into a maintenance state by:
      releasing the screw connections that couple the reinforcing element to the structural component, and
      removing the reinforcing element;
   performing maintenance work on the wind turbine; and
   transferring the wind turbine from the maintenance state into the operating state by:
      obtaining the reinforcing element or a replacement reinforcing element, and
      connecting the reinforcing element or the replacement reinforcing element to the fastening portion of the structural component by inserting screw fastening means into at least some of the fastening holes and screwing the reinforcing element or the replacement reinforcing element to the fastening portion of the structural component to achieve defined pre-stressed screw connections.

* * * * *